(12) United States Patent
Vojtila et al.

(10) Patent No.: US 7,541,546 B2
(45) Date of Patent: Jun. 2, 2009

(54) INSULATION BARRIER FOR HIGH VOLTAGE POWER LINES AND METHOD OF INSTALLATION OF SAME

(75) Inventors: Robert Vojtila, Southington, CT (US); Mark Hatje, Cheshire, CT (US); Herbert Kleinegger, Bristol, CT (US)

(73) Assignee: Midsun Group, Inc., Southington, CT (US)

( * ) Notice: Subject to any disclaimer, the term of this patent is extended or adjusted under 35 U.S.C. 154(b) by 0 days.

(21) Appl. No.: 11/713,913

(22) Filed: Mar. 5, 2007

(65) Prior Publication Data

US 2008/0217053 A1 Sep. 11, 2008

(51) Int. Cl.
*H01B 17/00* (2006.01)

(52) U.S. Cl. .................. 174/138 E; 174/139; 174/151; 49/58; 52/101; 361/604

(58) Field of Classification Search ................. 174/139, 174/151, 101, 138 E, 137 B, 137 R; 49/58, 49/59; 361/604, 618, 232; 52/101
See application file for complete search history.

(56) References Cited

U.S. PATENT DOCUMENTS

| | | | |
|---|---|---|---|
| 1,766,636 | A | 6/1930 | Holzel |
| 2,999,479 | A | 9/1961 | Carder |
| 3,005,436 | A | 10/1961 | Caldwell |
| 3,192,311 | A | 6/1965 | Weinfurt |
| 3,410,936 | A | 11/1968 | Juras |
| 3,639,678 | A | 2/1972 | Muschong |
| 3,639,681 | A | 2/1972 | Ettinger |
| 4,053,707 | A | 10/1977 | Ely et al. |
| 4,110,943 | A | 9/1978 | Carlson |
| 4,201,883 | A | 5/1980 | Shepherd |
| 4,359,844 | A | 11/1982 | Hoggard et al. |
| 4,500,595 | A | 2/1985 | Gerteisen et al. |
| 4,535,197 | A | 8/1985 | Butler |
| 4,637,164 | A | 1/1987 | Brown |
| 4,664,971 | A | 5/1987 | Soens |

(Continued)

FOREIGN PATENT DOCUMENTS

GB 1021457 11/1964

(Continued)

OTHER PUBLICATIONS

"Animal Caused Outages", Figures 8.1, 8.16, and 8.20, prepared by Southern Engineering Company Rural Electric Research, National Rural Electric Cooperative Association, Copyright 1996, 5 pages.

(Continued)

*Primary Examiner*—Dhiru R Patel
(74) *Attorney, Agent, or Firm*—Howard IP Law Group, PC

(57) ABSTRACT

The present invention relates to an insulated barrier preventing wildlife from simultaneously contacting an electrically energized and an electrically grounded surface, includes electrically insulated radially and axially extending members forming an hexagonal web having a first hexagonal rib that defines an opening offset from the geometric center of the barrier; and an insertion slot extending from an outer portion of said barrier to the offset opening for movement of said barrier onto electrical equipment utilizing and installation grip area for engagement with a gripping portion of an installation tool.

15 Claims, 4 Drawing Sheets

U.S. PATENT DOCUMENTS

| | | | |
|---|---|---|---|
| 4,731,507 A | 3/1988 | Torimoto et al. |
| 4,803,819 A | 2/1989 | Kelsey |
| 4,845,307 A | 7/1989 | Cumming et al. |
| 4,906,801 A | 3/1990 | Beasley |
| 5,023,406 A | 6/1991 | Thornley |
| 5,293,721 A | 3/1994 | Richard et al. |
| 5,293,835 A | 3/1994 | Shagoury |
| 5,299,528 A | 4/1994 | Blankenship |
| 5,326,947 A | 7/1994 | Edds et al. |
| 5,446,242 A | 8/1995 | Barrett |
| 5,644,641 A | 7/1997 | Ikeda |
| 5,648,641 A | 7/1997 | Guthrie |
| 5,650,594 A | 7/1997 | Urnovitz |
| 5,679,922 A | 10/1997 | Harben |
| 5,682,015 A | 10/1997 | Harben |
| 5,794,495 A | 8/1998 | Anderson |
| 5,834,686 A | 11/1998 | Barrett et al. |
| 5,864,096 A | 1/1999 | Williams et al. |
| 5,873,324 A | 2/1999 | Kaddas et al. |
| 5,884,426 A | 3/1999 | Ishida |
| 6,005,196 A | 12/1999 | Spillyards |
| D432,742 S | 10/2000 | Puigcerver et al. |
| 6,571,517 B2 | 6/2003 | Wulff et al. |
| 6,693,242 B1 | 2/2004 | Bailey |
| 6,878,883 B1 | 4/2005 | Rauckman |

FOREIGN PATENT DOCUMENTS

| | | |
|---|---|---|
| GB | 1542845 | 3/1979 |
| WO | 9510844 | 4/1995 |
| WO | 9635217 | 11/1996 |

OTHER PUBLICATIONS

Cooper Power Systems equipment brochure No. K-SEC 183, "Hi-Line Cover-Up Equipment", pp. 1-20, dated Mar. 1998.

3M corporation publicity release date—lined Austin, Texas—Apr. 16, 1998: "3M Electrostatic Animal Guard Humanely Keeps Animals Off Insulators & Bushings".

Hubbell/Chance Power Systems, Inc. catalog p. 2403, "Conductor and Insulator Covers" and p. 2408, Crossarm Cover and Conductor and Insulator Covers dated Jan. 2002.

Wall Street Journal article dated Feb. 4, 2003: "Fried Squirrel Fails to Find Favor with Public Utilities . . . as Electrocuted Critters Cause Power Outages".

Internet pages printed Sep. 11, 2003 from www.critterguard.org: "Reliability demands the only true barrier!" (5 sheets total, 2 of which are essentially blank).

3M brochure No. 78-8121-1107-7 Copyright 1998: "Electrostatic Animal Guard (Formerly the Guthrie Guard)" (4 sheets total).

Page 325 (undated) of 3M Cable Accessory Products catalog : "Electrostatic Animal Guard".

INSULATION BARRIER FOR HIGH VOLTAGE POWER LINES AND METHOD OF INSTALLATION OF SAME

FIELD OF THE INVENTION

This invention relates to barriers for preventing animals from causing phase-to-ground contact outages in high voltage equipment.

BACKGROUND OF THE INVENTION

Wildlife such as squirrels, birds and similar animals create serious power disruptions when they inadvertently short circuit power equipment. The damage usually disables the distribution and substation equipment used to supply electrical energy. When high voltage short circuits occur power outages typically result which are costly and affect vital services. Solutions to prevent animals from approaching power equipment, such as the use of chemical pesticides, are not environmentally friendly. Additionally pesticides must be continually applied and are expensive. Physical barriers to prevent animals from climbing into the electrical equipment have been found to be effective. The prior art discloses various approaches such as cone-shaped, cylindrical and cap-shaped devices, each of which is comparatively large because of their need to fit over and enclose an insulator skirt. These are difficult to store and transport. Flat or planar devices, some circular and others rectangular shaped, tend to be easier to transport and store. Additionally, some prior art devices require that the power be turned off before installing the barrier. Others however, do not require this step (see, U.S. Pat. No. 5,650,594). Rauckman U.S. Pat. No. 6,878,883 and Williams U.S. Pat. No. 5,864,096 disclose circular shaped planar designs that do not require that power be turned off before installing the barrier. However, due to the configuration of these devices, they are susceptible to failures, especially in the areas of the insertion slot. This is partly due to the inherent inflexibility of the design under stress and distribution of the weight and balance when installed. From the end users perspective William's cannot easily remove the barrier from an insulator without its "teeth" in the insertion slot breaking. Once the teeth break, the barrier will not stay securely mounted to the insulator, rendering the barrier useless. Furthermore a barrier damaged during removal does not allow reuse of the barrier following inspection, repair and periodic maintenance.

SUMMARY OF THE INVENTION

The present invention pertains to a barrier to guard against wildlife contacting an electrically energized and an electrically grounded surface. The barrier has a hexagonal offset opening where electrical power equipment devices such as a ceramic insulator securely mount. The hexagonal offset opening imparts flexibility on the insertion side and thereby facilitates passage onto the insulator. A generally polygonal network contributes to its flexibility thereby improving long-term reliability and the ability to reuse the barrier. Notably, centrally offsetting of the mounting of the device to the insulator central location serves to better balance the barrier when installed.

One aspect of the invention is a barrier that isolates an electrical device from wildlife comprising a plurality of electrically insulated radially and axially extending members forming polygonal structures including a first hexagonal rib forming an opening offset from the geometric center of the barrier; an insertion slot extending from an outer portion to said offset geometric center for moving said barrier onto an electrical device; and at least one installation grip area for engagement with a gripping portion of an installation tool to mount said barrier onto an electrical device.

BRIEF DESCRIPTION OF THE DRAWINGS

It is to be understood that the accompanying drawings are solely for purposes of illustrating the concepts of the invention and are not drawn to scale. The embodiments shown in the accompanying drawings, and described in the accompanying detailed description, are to be used as illustrative embodiments and should not be construed as the only manner of practicing the invention. Also, the same reference numerals have been used to identify similar elements.

DETAILED DESCRIPTION OF THE INVENTION

It is to be understood that the figures and descriptions of the present invention have been simplified to illustrate elements that are relevant for a clear understanding of the present invention, while eliminating, for the purpose of clarity, many other elements found in typical barrier systems and methods of using the same. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

Figure 1:
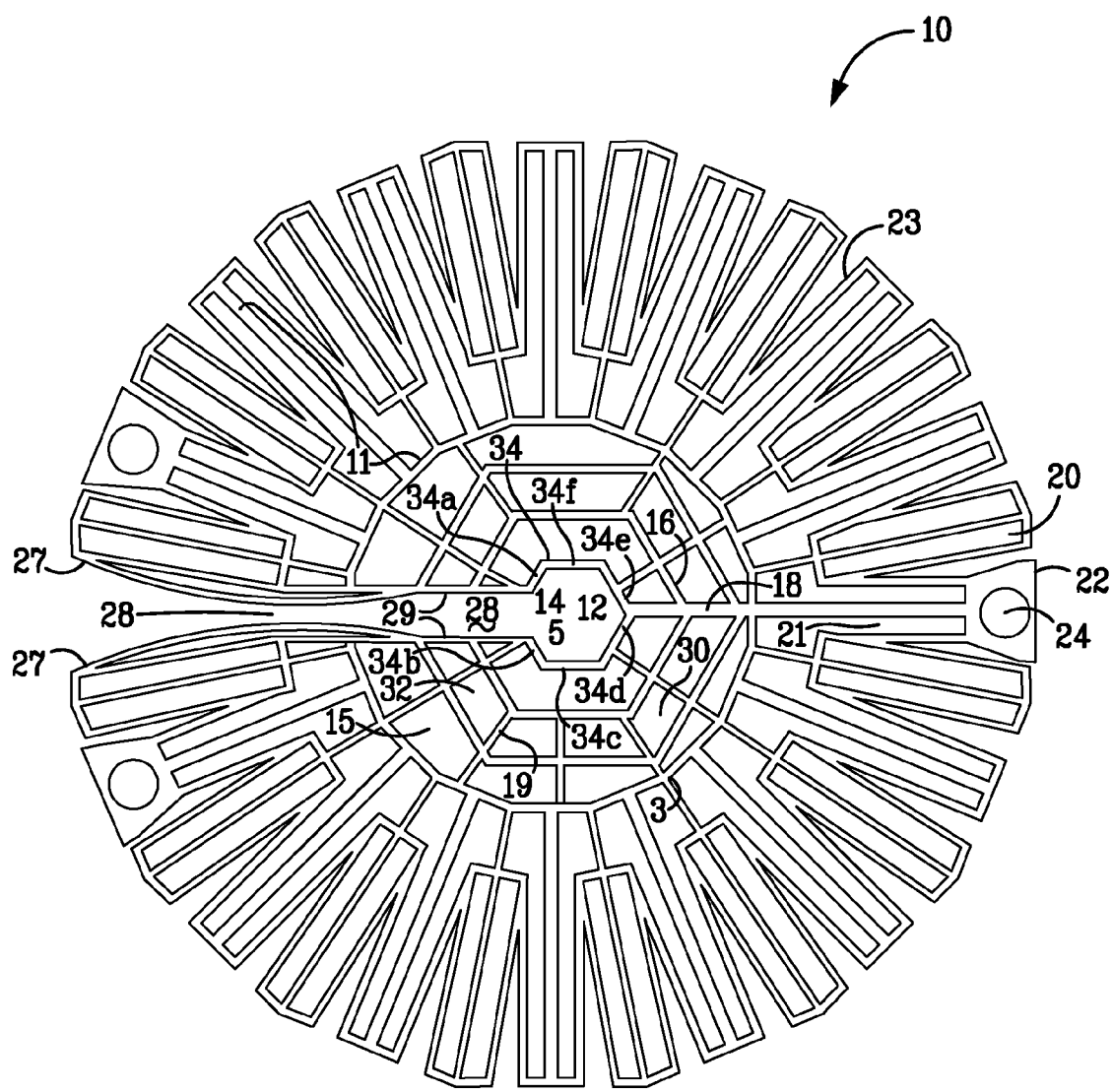
FIG. 1 is a plan view of an insulation barrier according to an embodiment of the present invention.

The barrier 10 as depicted in FIG. 1 is a polygonal disc that serves to block animals from climbing onto high power electrical devices and causing phase-to-ground contact. The polygonal disc is formed of a plurality of spaced apart, irregularly shaped polygonal enclosed areas 30. For purposes of discussion the irregularly shaped enclosed areas 30 are disposed within two imaginary concentric circles A and B. The circle A is defined as the circumscribed perimeter enclosing an inner polygonal rib 3. The circle B is defined as the circumscribed perimeter enclosing an outer boundary of the barrier 10. In the barrier 10 region between an interior offset opening 14 and the circumference of circle A the barrier 10 utilizes substantially orientated axial and radial ribs 11 to form generally irregularly shaped three-sided to eight-sided polygonal structures 32. The network formed axially about the offset opening 14 has a generally hexagonal configuration and defines bounded areas such as area 15. In the barrier 10 region between the circumference of imaginary circle A and the circumference of imaginary circle B, substantially orientated axial and radial ribs form irregularly shaped four, five and six-sided polygonal structures 23 axially disposed and defining bounded areas 20 and 21.

Figure 2:
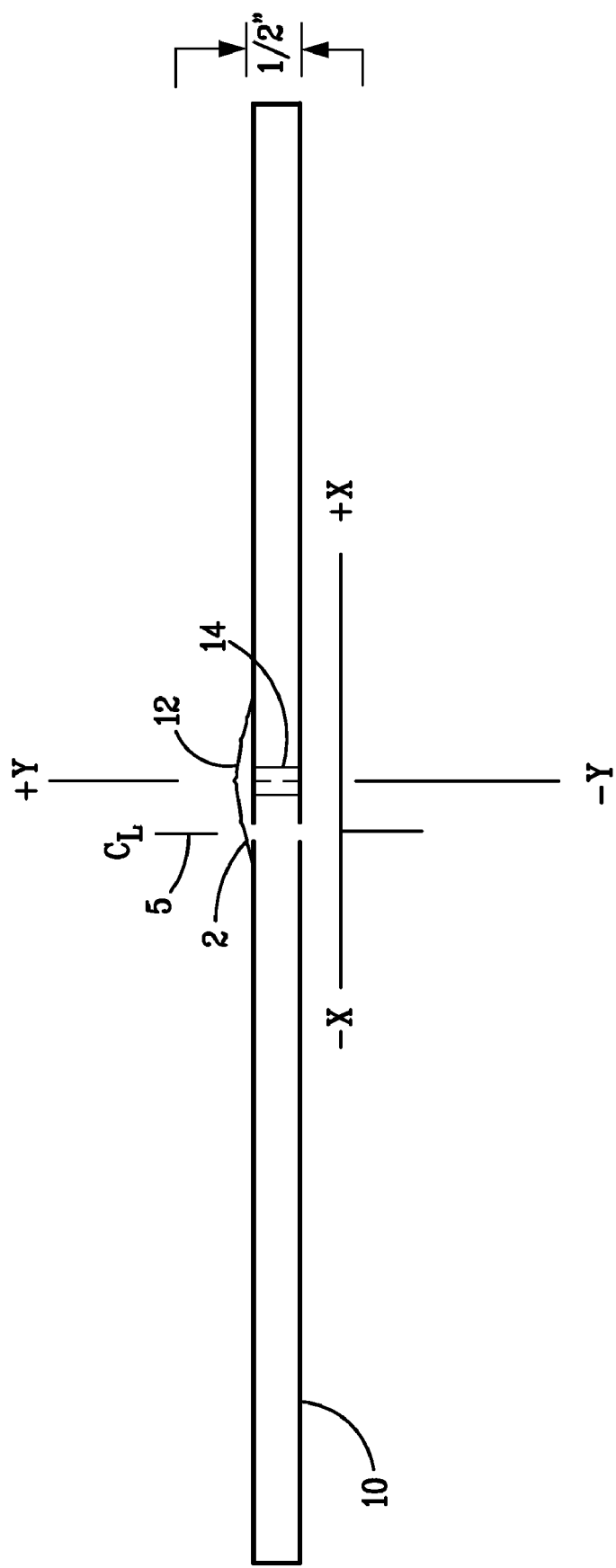
FIG. 2 is an elevation showing an insulation barrier according to an embodiment of the present invention.

Referring now to FIG. 1 and FIG. 2, the solid areas 22 and rib members, 18, 19, 23, 27, 29 are typically about one-half inch in vertical height or thickness along the X-axis. As illustrated in FIG. 2 by way of example and not limitation, the central point 5 of the opening 14 may be somewhat thicker in the region 2 than the more distance radial components to strengthen the area, where for example the loads are expected to be either greater or lesser depending on a particular application (e.g. to withstand impact from large tree branches in the proximity of the barrier 10). In one non-limiting embodiment, the barrier 10 is constructed from of an engineered polycarbonate thermoplastic, although the barrier 10 can be constructed from any material that provides the requisite insulating dielectric commensurate with the voltages against which the wildlife is protected.

Figure 3:
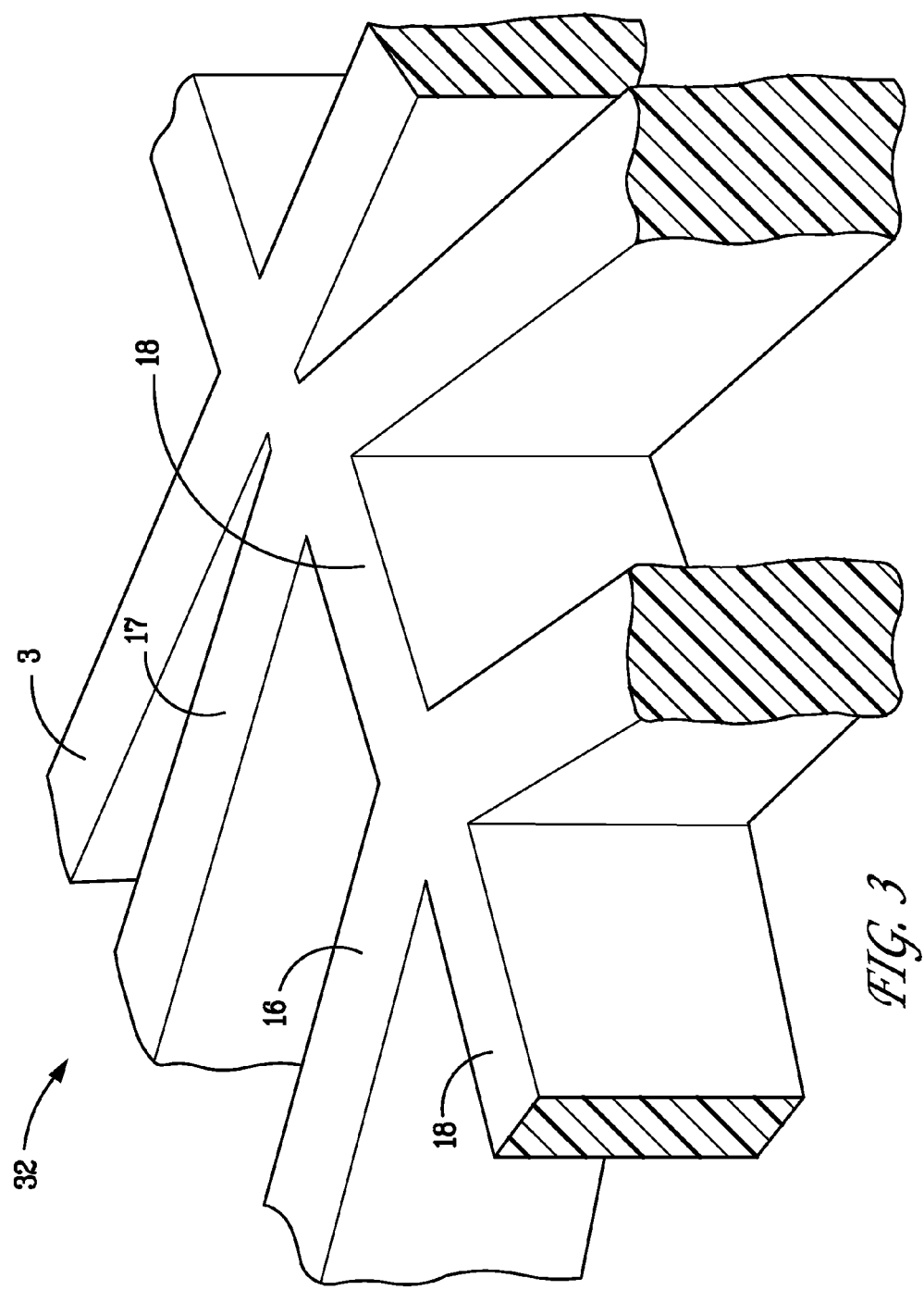
FIG. 3 is a perspective view of a section of the insulation barrier according to an embodiment of the present invention.

FIG. 3 shows a cut-away view of radially extending member 18 as attached to one of a set of cross member polygonal ribs 16,17 forming a hexagonal web 32 (also see, FIG. 1). Referring to FIG. 1, the bounded areas 15, 20 and 21 are in part formed by a network of rib members, 16, 18, 19, 27, 29 to create spaces for purposes of (1) reducing weight, (2) balancing the barrier 10 on its mount, (3) preventing the accumulation of rain, (4) permitting the melting ice and snow to pass through, (5) allowing power washing effects, small debris and wind to pass relatively unimpeded and (6) improving the flexibility of the barrier 10 network of rib members so as to improve reliability.

Figure 4:
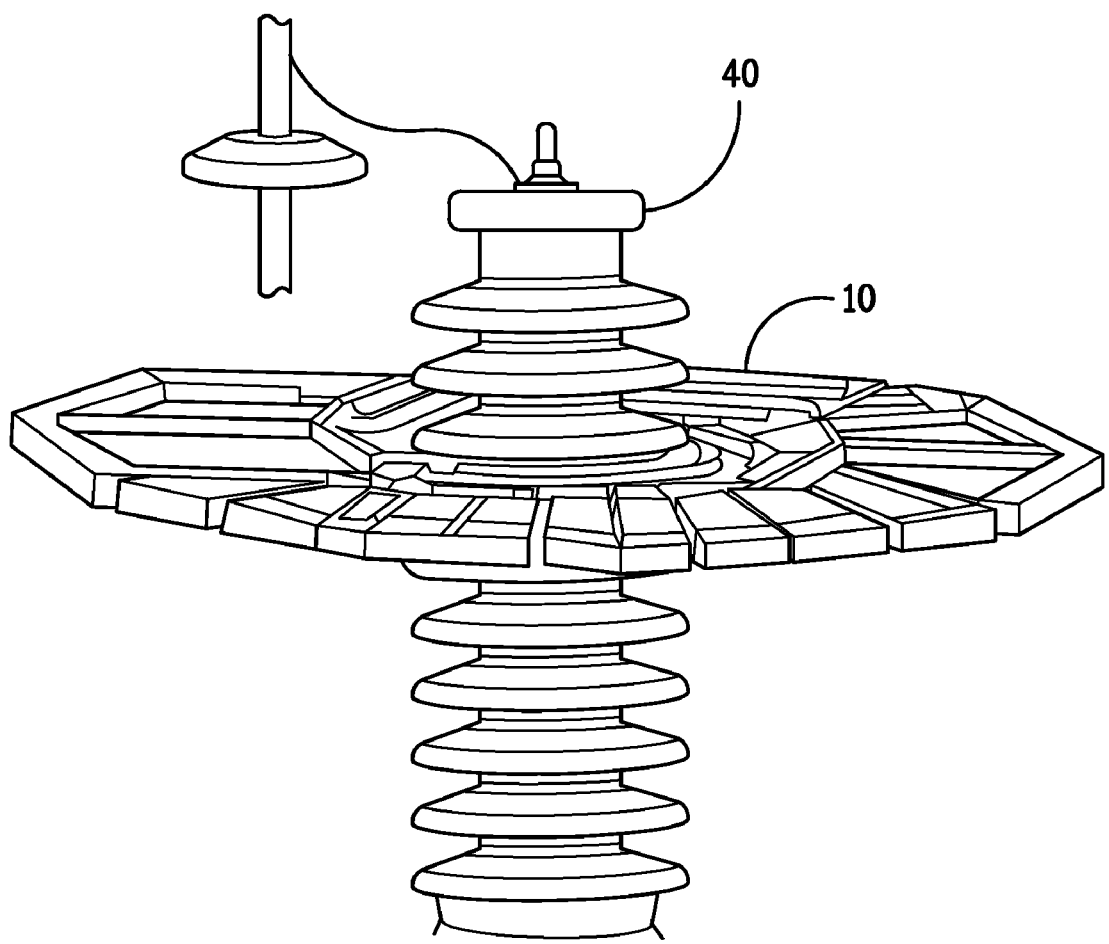
FIG. 4 is a perspective view of an insulation barrier mounted upon a ceramic insulator according to an embodiment of the present invention.

Referring to FIG. 1 and FIG. 4, a hexagonal rib 34 having segments 34a-34f forms the offset opening 14 for fitting onto the electrical equipment such as insulator 40. The offset opening 14, the center 12 of which is not at the geometric center 5 of the structure of the circumference of the concentric circle B, balances center of gravity of the barrier 10 by taking into account that the weight right of the Y-axis is greater than the weight left of the Y-axis (See FIG. 3). The displacement in the direction to the right of the Y-axis thereby equalizes the moment of forces right and left of the Y-axis thus balancing the barrier. Center 12 is thus the center of gravity of barrier 10 and is displaced from the geometric center.

As shown in FIG. 1, an insertion slot 28 formed from ribs 27, 29 extends from an outer portion to said offset opening 14 for movement of said barrier 10 onto the insulator 40. The sides of the insertion slot 28 form a continuous insertion slot featuring smooth, gradually curved arcs that slightly reduce the width of the insertion slot along a portion thereof. When sliding the barrier 10 into a cylindrically shaped electrical device such as the ceramic insulator 40 shown in FIG. 4, the insertion slot 28 opens its gradually curved arcs that serve to expand while the ribs 27, 29 press tightly against the side surface of the insulator. The large diameter of the insulator 40 stresses the ribs 27, 29 forcing them to separate as it proceeds through the continuous insertion slot while transmitting the forces to the first hexagonal rib 34 segments 34a-34h. As the opening 14 expands and therefore hexagonal rib 34 expands or stretches to accommodate the insulator 40 it distributes axial and radial forces among the components 34a through 34f and the corresponding attached axial members thus reducing the stresses to offset opening 14 as compared to a barrier having a an analogous but circular rib opening.

The hexagonal shape of the central opening 14 surrounds the typically cylindrically shaped ceramic insulator 40 making perimetric contact between the side surfaces of the central opening 14 segments 34a-34f and the outer surface of the insulator 40 thus holding the barrier 10 firmly in place. The hexagonal shape of the central opening 14 when compared to a barrier having a generally circularly shaped opening offers a better grip due to specific pressure points between the side surfaces of the central opening 14 segments 34a-34f and the cylindrically shaped ceramic insulator 40. The specific pressure points of the present invention offers a stable platform against the forces of wind, animals and other environmental factors that may cause the barrier to move, twist or spin. Thus, when compared to a barrier having a generally circularly shaped opening, the barrier 10 has a reduced chaffing along the side surface of the coated and polymer insulators such as insulator 40 and therefore reduces premature wear and damage.

When dust dirt and contaminants are deposited on any barrier the potential increases for an electrical charge to follow the path from the contaminant to the insulator and eventually to the high voltage supplied through a conductor in the insulator 40 core. This type of discharge increases the likelihood of damage and consequent power outages to the electrical equipment. Two features reduce the potential increases for an electrical charge to follow such as path: (1) reducing the surface area of the barrier 10 between the contaminant to the insulator and reducing the tracking resistance between the contaminant to the insulator. A flat or continuous planar surface barrier would provide the least resistance from a contaminant because of its large surface area. However, the hexagonal and polygonal design of the interior portions of the barrier 10 provides less opportunity for dirt and contaminants to permanently lodge because its ribbed design provides for ample spaces. Furthermore the overall surface area of the hexagonal and polygonal design is less than a planar surface of the same size because it increases the overall tracking resistance, that is the distance a charge has to travel, by elongating the path of resistance to the insulator 40 core and hence the high voltage core.

There are one or more solid areas depicted as corresponding plate members 22 at the outer portion of the barrier 10, each with through holes 24 located substantially in the center of the associated member 22 for gripping by insulated handling equipment. The circular through hole 24 serves to permit passage of a gripping portion of an installation tool while installing and removing the barrier 10. However, the circular through hole 24 of the barrier 1 is notably centrally located in the plate members 22 optimizing leverage of the handling equipment thus improving passage ports adjacent to a plate member.

A process of mounting the barrier 10 includes the steps of (1) placing an installation tool (not shown) at the centrally located through 24 hole of the member 22 provided on a barrier 10; and (2) installing the barrier 10 onto insulator 40 by steadily pushing the barrier onto the insulator 40; until the hexagonal offset opening expands to the circumference of the insulator.

A process for removing the barrier 10 from an insulator includes the steps of (1) placing an installation tool (not shown) at the centrally located through 24 hole of the member 22 provided on a barrier 10; and (2) de-installing the barrier 10 from the insulator 40 by steadily pushing the barrier from the grip of the insulator 40 as the hexagonal offset opening retracts and the insulator is finally removed.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. An insulation barrier, comprising a plurality of electrically insulated radial and axial ribs, defining a hexagonal opening offset from the geometric center of the barrier and an insertion slot extending from an outer portion to said offset hexagonal opening; and wherein the sides of the insertion slot are substantially gradually curved arcs that serve to reduce the width of the insertion slot along a portion of the length of the insertion slot.

2. The insulation barrier of claim 1, further comprising at least one installation grip area for engagement with a gripping portion of an installation tool.

3. The insulation barrier of claim 2, wherein said installation grip area comprises at least one plate member.

4. The insulation barrier of claim 3, wherein the plate member includes a through hole located substantially in the center of the member.

5. The insulation barrier of claim 1, wherein the radial and axial ribs form irregularly shaped polygonal structures.

6. The insulation barrier of claim 1, wherein those of the radial and axial ribs located about the offset opening have a hexagonal configuration in the radial direction.

7. The insulation barrier of claim 1, wherein a network of radially projecting polygonal irregular segments are axially disposed.

8. The insulation barrier of claim 1, wherein radially extending ribs attach to cross members to form a hexagonal web.

9. The insulation barrier of claim 1, wherein bounded areas formed by polygonal structures create spaces.

10. The insulation barrier in claim 1 wherein the hexagonal opening substantially balances substantially at the center of gravity of the barrier.

11. The insulation barrier of claim 1, wherein the gradually curved arcs are adapted to receded, so as under pressure to increase the width of the insertion slot.

12. The insulation barrier of claim 1, wherein the hexagonal opening expands radially during insertion of the barrier.

13. The insulation barrier of claim 12 having perimetric contact between side surfaces of the central opening segments and the outer surface of an insulator.

14. A process of mounting an insulation barrier having a plurality of electrically insulated radial and axial ribs, defining a hexagonal opening offset from the geometric center of the barrier and an insertion slot extending from an outer portion to said offset hexagonal opening; and wherein the sides of the insertion slot are substantially gradually curved arcs that serve to reduce the width of the insertion slot along a portion of the length of the insertion slot comprising the steps of (1) placing an installation tool at a centrally located through hole of a plate member provided on the periphery of the barrier; and (2) installing the barrier onto an insulator by steadily pushing the barrier onto the insulator through the continuous insertion slot until the hexagonal opening offset from the geometric center of the barrier expands to the circumference of the insulator.

15. A process for removing an insulation barrier having a plurality of electrically insulated radial and axial ribs, defining a hexagonal opening offset from the geometric center of the barrier and an insertion slot extending from an outer portion to said offset hexagonal opening; and wherein the sides of the insertion slot are substantially gradually curved arcs that serve to reduce the width of the insertion slot along a portion of the length of the insertion slot from an insulator comprises the steps of (1) placing an installation tool at a centrally located through hole on a member at the periphery the barrier; and (2) de-installing the barrier from the insulator by steadily pushing the barrier from the grip of the insulator through the continuous insertion slot as the hexagonal offset opening retracts and the insulator is finally removed.

* * * * *